Jan. 26, 1943.   M. L. RATHBUN   2,309,535
ARTICLE
Filed Jan. 12, 1940

Inventor
Merrill L. Rathbun
By Richmond S. Hayes
Attorney

Patented Jan. 26, 1943

2,309,535

UNITED STATES PATENT OFFICE 2,309,535

ARTICLE

Merrill L. Rathbun, Salamanca, N. Y.

Application January 12, 1940, Serial No. 313,552

2 Claims. (Cl. 220—67)

This invention relates to an improvement in manufactured articles comprised of two or more elements.

The invention, in one form, is applied to molded articles that are comprised of at least two elements. The elements are separately molded from any commercial plastic material and include corresponding parts that may be engaged in common by suitable fastening or securing means.

Prior to this invention it has been the general practice in molding articles from plastic materials to so design such articles as to eliminate undercut surfaces and somewhat concealed cavities, for the reason that the molds required are not only of a complicated nature, and expensive to produce, but not satisfactory, since damage to the molded article as well as the mold frequently occurs. Of course the purpose of undercut surfaces or cavities is to reduce the amount of material and weight, as well as improve the appearance and utility of a molded article. With the present demand for molded articles of all manner of design and utility it has become necessary to develop some method of manufacturing such articles without the use of complicated and expensive molds.

The present invention, by the elimination of complicated molds, makes practicable the molding of articles from plastic material with greater variety in design and utility, and this therefore constitutes one of the objects thereof.

Another object of the invention lies in the assembly of an article from two or more separate elements molded from suitable plastic material.

Another object of the invention makes practicable the separate production of two or more elements that, when joined together, form a complete article, or complete that portion of an article in a given form that was heretofore difficult or impossible to produce as a single element.

Another object of the invention lies in the provision of means for fixedly joining two or more separately produced elements of an article of manufacture.

Another object of the invention lies in the provision of an article comprised at least in part of two or more elements, separately molded from any suitable plastic material, that are permanently joined together.

Another object of the invention lies in the provision of an article of manufacture comprised in part of two or more molded plastic elements that are fixedly joined by means of drive fitted keys.

Other objects and advantages of the invention will be more fully understood from a consideration of the following specification taken in conjunction with the accompanying drawing; and in which Figure 1 is a perspective view of a two element article of manufacture embodying one form of the invention;

Figure 1:
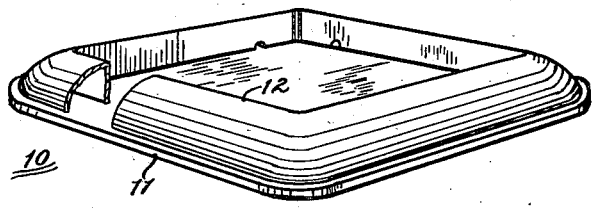
Figure 2:
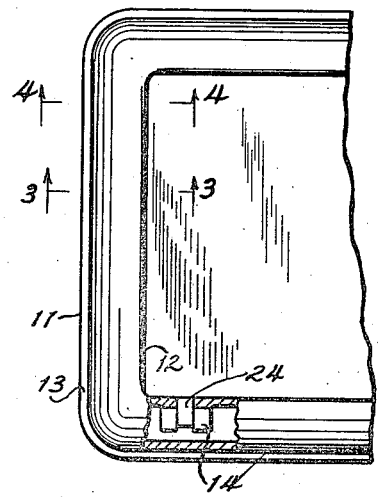
Figure 2 is a fragmentary plan view of the article shown in Figure 1, parts being broken away to illustrate certain of the structural details.
Figure 3:
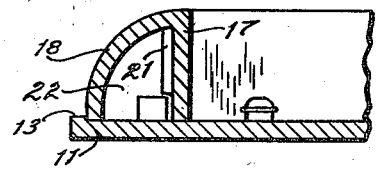
Figure 3 is an enlarged vertical sectional view taken substantially on the line 3—3 of Figure 2.
Figure 4:
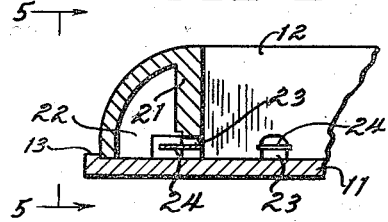
Figure 4 is another enlarged vertical sectional view taken substantially on the line 4—4 of Figure 2.
Figure 6:
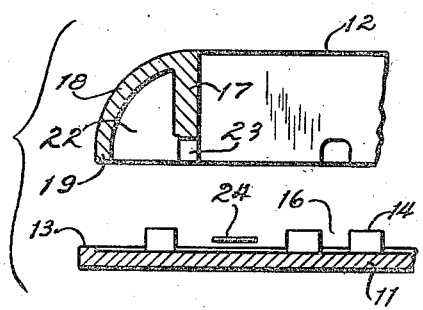
Figure 6 is an exploded view showing the elements of the article prior to assembly.
Figure 5:
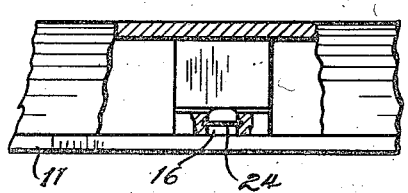
Figure 5 is a fragmentary elevational view taken in the direction indicated at 5—5 of Figure 4, parts being broken away to disclose the overlapping arrangement of certain of the parts.

Reference is now had to the drawing wherein the numeral 10 is employed to generally designate an article of manufacture to which the present invention is applied. The article illustrated takes the form of a tray that is comprised of a base 11 and upright rim or wall member 12. The base shown is a flat rectangular member having a slight upwardly directed marginal flange 13. Spaced slightly inwardly from all four edges of the base, and in any desired duplicate arrangement, are pairs of upstanding lugs 14. Each pair of lugs forms an open ended transverse slot 16. It is evident that no problem is involved in the manufacture of a mold for producing the base 11, by reason of the simple structural details.

The rim member 12 may comprise interior upright walls 17 that, at their upper edges, are integral with outwardly and downwardly curved walls 18. The lower edge 19 of the wall 18 may seat on the base 11 adjacent flange 13. All four walls 17 at suitable intervals may be formed with reinforced portions 21 that extend into the space 22 between walls 17 and 18. At the lower edge of the wall 17, and centrally of each reinforced portion 21, is an outwardly opening slot 23. When the member 12 is positioned on the base 11, slots 23 register with slots 16. From the foregoing it is evident that there are no cavities or undercuts that would require the use of a complicated mold for the manufacture of the member 12.

The assembly of article 10 from a pair of elements, such as the base 11 and member 12, is as follows: The member 12 is positioned on the base 11 with the lower edge of the wall 18 abutting flange 13. Small metal disks 24 are provided for the purpose of locking together the overlapping portions of the two elements of the article, namely, lugs 14 and portions 21. These disks are of a width slightly greater than the width of slots 16 and 23 and are each formed with a sharp forward edge. When forced into the slots from the interior of the article, they cut their own groove in the plastic material of which the parts are formed and serve to prevent relative displacement.

When the elements of the article 10 are assembled it will be noted that the space within the member 12 becomes a closed compartment and that it would be impossible to mold this article in a single piece. It is evident that the rim member 12 could be solid rather than hollow as shown, but this would involve a considerable increase in material and weight and would not be practical, in view of the tendency of fairly thick plastic articles to warp subsequent to being removed from a mold.

Although applicant has shown and described only one design of an article comprised of two separately manufactured elements and illustrated only one form of means for rigidly fixing the elements together, it is to be understood that the means of securement may be varied, as well as its application to articles of more than two elements and of different design, without departing from the spirit and scope of the invention as defined in the hereunto annexed claims.

Having thus set forth my invention what I claim as new and for which I desire protection by Letters Patent is:

1. In an article of manufacture of the receptacle type having separate base and wall elements, upstanding portions on the base element spaced to provide slots, portions of the wall element having slots, interengageable means on said elements serving to align said slots when said elements are brought into abutment, and metallic disks having drive fit engagement with certain walls of the aligned slots, said disks being self-grooving in the walls of said slots and serving to secure said elements against relative displacement.

2. In an article of manufacture of the receptacle type having at least two separately produced wall elements, portions on each of said elements providing open-ended slots, interengageable means on said elements serving to align said slots when said elements are assembled, the walls of said slots being in overlapping arrangement, and means having self-grooving engagement with opposite walls of the slots of the assembled elements and being inserted into said slots at substantially right angles to the direction of assembly of said elements said opposite walls extending in the direction of assembly of the elements, the groove of one element being a substantial continuation of the groove of the other element.

MERRILL L. RATHBUN.